L. H. NORTH & H. C. DECKER.
SPOKE SUPPORT.
APPLICATION FILED MAY 19, 1910.
991,742.
Patented May 9, 1911.
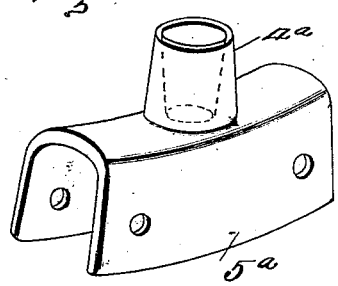
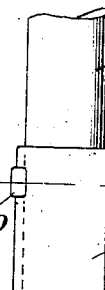
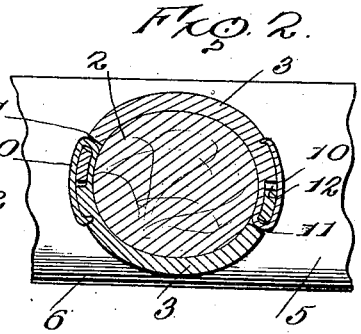
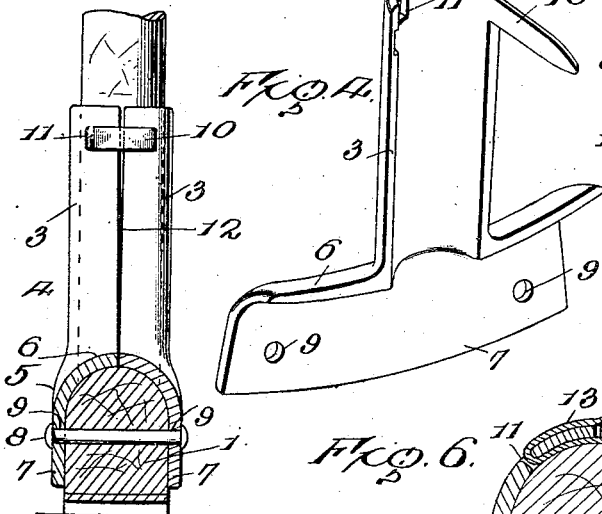
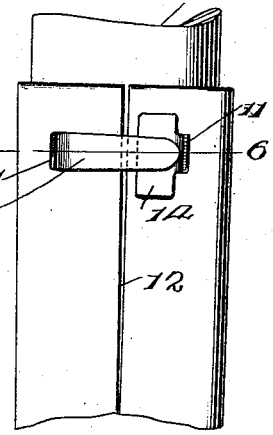
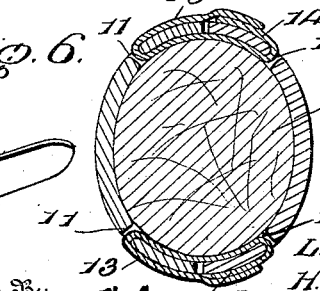
Inventors
L. H. North
H. C. Decker

UNITED STATES PATENT OFFICE.

LYMAN H. NORTH AND HARRY C. DECKER, OF CASTLE, OKLAHOMA.

SPOKE-SUPPORT.

991,742.  Specification of Letters Patent.  Patented May 9, 1911.

Application filed May 19, 1910. Serial No. 562,262.

*To all whom it may concern:*

Be it known that we, LYMAN H. NORTH and HARRY C. DECKER, citizens of the United States, both residing at Castle, in the county of Okfuskee and State of Oklahoma, have invented certain new and useful Improvements in Spoke-Supports, of which the following is a specification.

The object of the present invention is a spoke support including a clip adapted to be secured to the felly of the wheel, and a tubular socket rigid with the clip and arranged to receive the outer end of the spoke, the support holding the spoke firmly in engagement with the felly and serving to reinforce the wheel at this point, whereby to materially increase the rigidity and durability of the structure.

A further object of the invention is a device of this character which is designed particularly for use in repairing old wheels, and which is composed of separate co-acting sections, so as to render the support susceptible of being expeditiously applied to an old wheel without the necessity of separating the felly from the spoke or in anywise changing the structure of the wheel, the sections of the support being positively held in association in a novel manner.

With these and other objects in view that will more fully appear as the description proceeds, the invention consists in certain constructions and arrangements of the parts that we shall hereinafter fully describe and then point out the novel features of in the appended claim.

For a full understanding of the invention and the merits thereof and also to acquire a knowledge of the details of construction, reference is to be had to the following description and accompanying drawing, in which:

Figure 1 is a fragmentary side elevation illustrating the application of our improved spoke support; Fig. 2 is an enlarged section on the line 2—2 of Fig. 1; Fig. 3 is a section on the line 3—3 of Fig. 1; Fig. 4 is a perspective view of one of the mating sections detached; Fig. 5 illustrates another form of connection between the mating sections; Fig. 6 is a section on the line 6—6 of Fig. 5; Fig. 7 is a detail perspective view of one of the separate tongues employed in the form of the invention illustrated in Figs. 5 and 6; and, Fig. 8 illustrates a still further embodiment of the invention.

Corresponding and like parts are referred to in the following description and indicated in all the views of the drawing by the same reference characters.

Referring to the drawing, the numeral 1 designates the felly of a wheel of the usual construction, and 2 designates one of the spokes of the wheel. Our invention relates particularly to an improved support through the medium of which the spoke and felly are connected.

The support is bisected in the plane of the wheel to form substantially duplicate mating sections 3 which are entirely separate and are arranged, when placed side by side, to co-act to provide a tubular socket 4 and a clip 5. The clip is arranged to embrace the felly 1 and includes a base plate 6 which bears against the inner face of the felly, and side flanges or jaws 7 which fit against the sides of the felly. The side flanges are connected by means of rivets 8, that are passed transversely through the felly and through the registering openings 9 in the flanges, it being understood however that bolts or like fastening devices may be employed in lieu of the rivets. The rivets positively attach the clip to the felly, and also serve to hold the side flanges against the sides thereof. The office of the side flanges is to hold the clip against lateral displacement with respect to the felly and also to brace the felly against possible splitting.

The tubular socket 4 projects radially inwardly from the base plate toward the hub of the wheel and receives the outer end portion of the spoke 2. The tubular socket preferably opens through the base plate so that the extremity of the spoke may be arranged in abutting relation to the inner face of the felly or may be fitted in a bore therein, according as desired. The socket, of course, positively holds the spoke against accidental disconnection from the felly.

The sections of the socket are held in association by being tied together at their meeting edges, this having been found particularly desirable in practice since the connecting means does not pass through the spoke and therefore has no tendency to weaken the same. In one form of the invention, the sections of the socket have an interlocking connection which is effected through the medium of a plurality of bendable tongues 10 which extend across the meeting edges of the sections, each tongue being integral with one of the sections and being adapted to be bent into engagement with a slot 11 formed in proximity to the meeting edge of the other section. In the present instance we have only shown two of these tongues which are arranged on opposite sides of the socket and are located at the inner end of the socket, that is, the end remote from the clip 5. It is to be understood however that we do not limit ourselves to the use of only two tongues, but may employ any desired number of tongues along the meeting edges of the sections. Attention is here directed to the fact that the meeting edges of the sections are flared toward the inner end of the socket, as indicated at 12, so as to enable the socket to receive spokes of different sizes and to permit the inner ends of the sections to be drawn together by the tongues to secure a firm purchase on the spoke. (See Fig. 3.)

In practice the support may be easily and quickly applied to a wheel by merely placing the mating sections in co-active position against opposite sides of the felly and the spoke, the rivets 8 and the tongues 10 being applied to hold the sections in association. The metal forming the sections is preferably bendable in order to permit the sections to be bent with a hammer or the like to conform to the contour of and to fit snugly against the parts of the wheel. The metal forming the sections 3 is preferably thickest at the juncture of the socket and the clip so as to materially reinforce the wheel at the joint between the spoke and the felly, which is usually the weakest point of the wheel.

It will be noted that the present invention is equally applicable to both new and old wheels, and that in the latter instance, it may be advantageously employed for repairing a broken wheel to materially lengthen its life. Furthermore the present invention is quite simple and durable, and may be easily and cheaply manufactured, and possesses certain other advantages that will be at once apparent to those persons familiar with the art to which the invention appertains.

In another form of the invention the sections of the spoke socket are formed at both of their meeting edges with slots 11, as best illustrated in Figs. 5 and 6. The connection between the sections is effected through the medium of a pliable tongue 13 that is separate from both sections. The tongue extends across the meeting edges of the sections with its ends passing outwardly through the adjacent slots 11, one end of the tongue being enlarged to form a head 14 that bears against the periphery of the socket to prevent the tongue from being withdrawn from the slots in one direction, while the other end of the tongue is bent across the meeting edges of the sections on the exterior of the socket and overlaps the said head.

Fig. 8 illustrates still another form of the invention in which the mating sections are not employed, but the support is cast or otherwise formed of integral structure to provide the spoke socket $4^a$ and the felly clip $5^a$. In other respects, this form of the invention is substantially similar to the support hereinbefore described.

Having thus described the invention, what we claim is:

A spoke support comprising a tubular spoke socket, a felly clip provided at one end of the socket, the socket and clip being bisected longitudinally to form separate coacting sections, and bendable tongues detachably connecting the sections together, each tongue extending across the meeting edges of the sections and lying flat against the periphery thereof.

In testimony whereof, we affix our signatures in presence of two witnesses.

LYMAN H. NORTH. [L. S.]
HARRY C. DECKER. [L. S.]

Witnesses:
J. E. EASTMAN,
T. E. ELLIOTT.